July 16, 1963     J. D. McHUGH     3,097,853
DYNAMIC SEAL
Filed Sept. 29, 1961
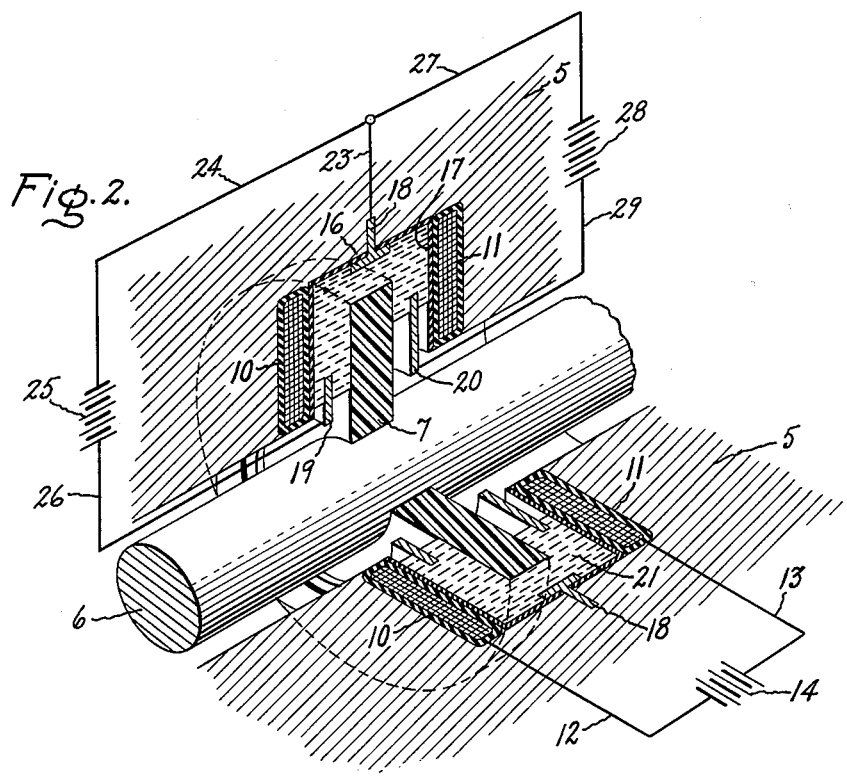
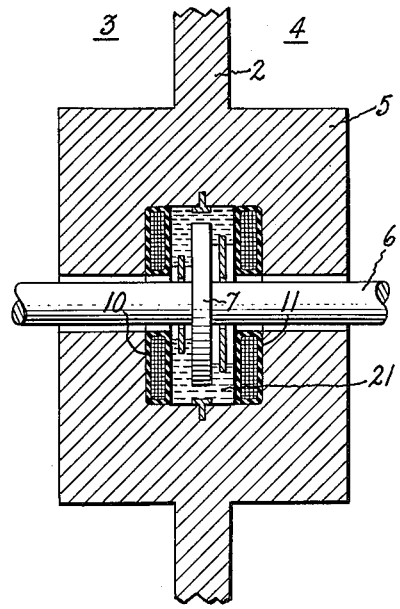
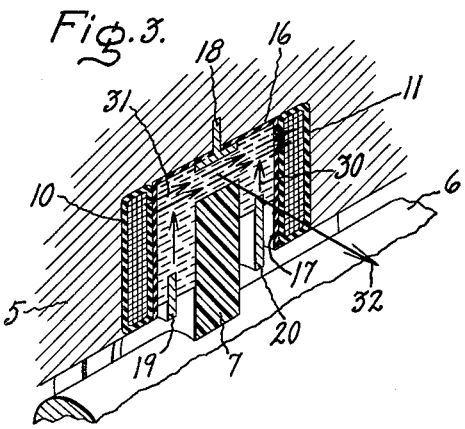
Inventor:
James D. McHugh,
by Paul G. Frank
His Attorney.

United States Patent Office 3,097,853
Patented July 16, 1963

3,097,853
DYNAMIC SEAL
James D. McHugh, Schenectady, N.Y., assignor to General Electric Company, a corporation of New York
Filed Sept. 29, 1961, Ser. No. 141,682
7 Claims. (Cl. 277—13)

The present invention relates to seal constructions and, more particularly, to seal constructions wherein fluid presure is utilized to perform a sealing function.

Seals having contacting elements are commonly utilized for general applications with the appreciation that the effectiveness of this type of construction may deteriorate with time due to friction and wear between the contacting portions. Under certain conditions, rubbing contact between portions of a shaft seal may be undesirable and other constructions must be utilized. An example of non-rubbing or contacting seals is a labyrinth seal wherein fluid leaking through the construction is directed through a tortuous path subjecting the fluid to a substantial pressure drop which minimizes leakage. It is recognized that this minimal leakage may be intolerable in some applications and this condition may require the use of other types of seals.

In other constructions, pressurized fluids are utilized between relatively movable members to perform the sealing function. An example of this type of construction is a structure including a liquid filled annular channel formed in a stationary member with the rotatable disk associated with a shaft extending into the annular channel. The liquid may be maintained within the channel by centrifugal force generated by the disk rotating through the fluid. The fluid in the channel may be subjected to pressures on the two sides of the seal in such a manner that a differential pressure head is maintained between the chambers, the fluid providing a seal therebetween. Most commonly, mercury is employed in the channel to provide the sealing fluid function.

Clearly, the latter construction requires continuous rotation of the disk to maintain the effectiveness of the seal. Obviously, a decrease in speed may be sufficient to make the seal inoperative. Accordingly, in certain operations, this type of seal is unsuitable because of the dependence on a continuously rotating member.

The chief object of the present invention is to provide an improved non-rubbing type seal.

Another object of the invention is to provide a non-rubbing shaft seal.

A further object of the invention is to provide an improved non-rubbing shaft seal utilizing fluid pressure to perform the sealing function.

A still further object of the invention is to provide a non-rubbing seal construction wherein a fluid performs the sealing function by being electromagnetically propelled along surfaces between the relatively moving portions thereof.

These and other objects of my invention may be more readily perceived from the following description.

Briefly stated, the present invention is directed to a seal construction wherein an electrically conductive fluid is located and maintained in intimate contact with a pair of spaced members by electromagnetic propelling means to perform a sealing function.

The attached drawings illustrate a preferred embodiment of the invention, in which:

FIGURE 1 is a sectional view of a seal employing the present invention;

FIGURE 2 is an enlarged, partially diagrammatic, perspective view illustrating the seal shown in FIGURE 1; and FIGURE 3 is an enlarged fragmentary view of FIGURE 2 illustrating the electromotive action on the fluid in the seal.

Referring to the drawings in more detail, there is shown in FIGURE 1 partition member 2 which separates two chambers 3 and 4 intended to be maintained at different pressures. For example, the seal may be used with a compressor where one chamber is the atmosphere, the other chamber is the casing of the compressor. In the illustrated embodiment, seal housing 5 is supplied in partition member 2 and rotatable shaft 6 may extend through the housing, the seal being adapted to maintain pressure conditions in chambers 3 and 4 despite the fact that shaft 6 may be a movable member.

Referring to FIGURE 2 which is a perspective view, partially in section, of the seal housing 5 shown in FIGURE 1, shaft 6 may have located thereon disk 7 which has a general circular shape and preferably is fabricated of a non-conducting material, for example, a plastic material. However, if desired, an insulated non-magnetic material may be utilized for reasons more fully understood hereinafter. Seal housing 5 may have associated therewith a pair of windings 10 and 11 located on the two sides of annular channel 16 provided in seal housing 5. Disk 7 is spaced from the walls of channel 16. By this particular construction, the windings located on the two sides of the channel are oriented and electrically connected to provide magnetic lines of force extending in an axial direction across channel 16. To generate a magnetic field, windings 10 and 11 may be connected in series and further connected by conductors 12 and 13 to a source 14 of direct current.

Channel 16 may be supplied with fluid 21, preferably a liquid, such as mercury. It can be seen that the channel construction described may function in the manner of a prior art seal construction wherein the rotation of shaft 6 and disk 7 imparts rotary motion to the liquid because the viscous drag imparts centrifugal force to the liquid maintaining it in the channel. The liquid in the channel maintains a barrier between the rotating and stationary members forming a seal. Because of the differences in pressure in the chambers, the legs of liquid in each side of the channel change in response to the pressure difference. The pressure difference is manifested in the head of liquid between the two levels in the channel.

It is apparent that the prior art seal construction utilizing viscous drag will cease to function with the rotation of disk 7 and is sufficiently low that it is unable to maintain the desired centrifugal forces on the liquid. Fluid pressure developed by its rotation will be too low to accomplish sealing and to maintain the liquid in intimate contact throughout 360 degrees with the stationary and rotating members.

The present invention recognizes this difficulty and provides means for maintaining liquid flow by electromagnetic means. The magnetic portion of the construction has already been described wherein magnetic lines of force pass through the channel in a general axial direction, substantially 360 degrees around shaft 6. In order to generate a motor action on the mercury or other electrically conductive fluid in channel 16, current should flow radially through the liquid. It is, therefore, desirable that the walls of the channel be coated or otherwise insulated by a suitable non-conducting coating 17 so that there will be little opportunity for current to bypass the mercury path and consequently make the construction inoperative. Similarly, it is noted that disk 7 is fabricated of non-conducting, and preferably non-magnetic, material so that it does not impede the action of the magnetic lines of force on the liquid or form a current conducting path.

The means for passing current radially through conducting liquid 21 in channel 16 may comprise a pair of stationary electrodes 19 and 20 which are annular in shape and envelope shaft 6. Since in the embodiment illustrated the pressure acting on the seal from chamber 3 is smaller than that acting on the fluid from chamber 4, the liquid leg adjacent electrode 19 is greater than the leg in the area of electrode 20. Accordingly, it will be appreciated that it may be desirable that the electrodes be constructed to maintain contact with the liquid during severe changes in pressure acting on the liquid and also at starting conditions.

Recognizing that in this embodiment current passes radially, receiving electrode 18 is placed in the deepest portion of channel 16, that is, adjacent the outer periphery thereof. In order to maintain the desired direction of current flow (radially) the electrode may have a general T cross section. From the described construction, it is apparent that the current flow is in a radial direction through 360 degrees and in planes generally normal to the magnetic lines of force passing through channel 16 by windings 10 and 11.

In order to pass current radially through liquid 21, a circuit may be provided wherein conductor 23 is connected to electrode 18 and two energizing circuits, the first circuit including conductor 24 which is connected to battery 25, conductor 26, and electrode 19. In this first circuit, the circuit is closed by the conducting action of the mercury or other conductive fluid 21. The second energizing circuit may include electrode 18, conductors 23 and 27, battery 28, conductor 29, and electrode 20 which also extends into channel 16 and is in intimate contact with fluid 21.

The action of the seal is illustrated further in FIGURE 3. It will be noted that magnetic lines of force 31 pass from the north to the south pole of the electromagnet comprising windings 10 and 11. Simultaneously, because of the previously described circuits, current passes from electrodes 19 and 20 in a general radial direction to annular electrode 18. As a result of certain well-known electromagnetic laws, namely, Ampere's law and further utilizing Fleming's rule, it can be seen that the interaction of the magnetic lines of force and the current flow through the conducting liquid imparts a force to the conducting liquid. This force shown by vector 32 in FIGURE 3 is the result of magnetic lines of force 31 acting on the current flow in direction 30. The direction of force 32 on the liquid is in a tangential direction causing the fluid to rotate circumferentially through the channel and the circumferential action causes centrifugal forces to be generated maintaining the fluid in the peripheral portion of channel 16.

Accordingly, it can be seen that in FIGURES 1 and 2, pressurized fluid is maintained in the channel in intimate contact with stationary housing 5 and disk 7 in a manner that a seal of pressurized fluid exists between chambers 3 and 4. The action of this seal is maintained despite the fact that the rotation of shaft 6 may be intermittent and may cease for extended periods of time.

While one embodiment of the invention has been illustrated, it can be readily appreciated that other modifications are apparent, for example, the magnetic field generated through channel 16 may be provided by the use of permanent magnets. Also, current may be passed through the fluid by utilizing disk 7 as an electrode.

While I have described a preferred embodiment of my invention, it will be understood that the invention is not limited thereto since it may be otherwise embodied within the scope of the appended claims.

What I claim as new and desire to secure by Letters Patent of the United States is:

1. In a seal, the combination of first member having means defining a channel, an electrically conductive fluid located in said channel, a second member extending into the channel, said first and second members being adapted to move relative to one another, means for passing an electric current through said fluid, and means for passing magnetic lines of force in a direction substantially normal to the current for electromagnetically propelling the fluid.

2. In a seal, the combination of a first member having an opening therein and means defining an annular channel adjacent said opening, a second member extending through said opening and having portions extending into said annular channel, said first and second members being spaced from one another, an electrically conductive fluid located in said channel and being in intimate contact with the first and second members, and electromagnetic means for propelling the fluid circumferentially through the channel comprising means for passing an electric current through the fluid and means establishing magnetic lines of force in a direction substantially normal to the current.

3. In a seal, the combination of a first member having an opening and means defining an annular channel in first member, said channel being located adjacent said opening, a second member being rotatably mounted with respect to said first member and having portions extending into said annular channel, an electrically conductive fluid in said channel, a substantially annular electrode extending along the outer periphery of the channel, a second annular electrode having a smaller diameter than the first electrode and being spaced therefrom and extending into the electrically conductive fluid, and means for passing magnetic lines of force in a direction substantially normal to the direction of current flow from the second to the first electrode to propel the fluid substantially circumferentially through the channel to maintain intimate fluid contact between the first and second member through 360 degrees.

4. In a seal arrangement, the combination of means defining a pair of chambers, partition means separating said chambers and having an opening therein, a member extending through said opening, an electrically conductive fluid located between the partition means and the member and being in intimate contact therewith, and means for electromagnetically propelling the fluid relative to the partition means comprising means for passing an electric current through the fluid and means establishing magnetic lines of force in a direction substantially normal to the current.

5. In a seal arrangement, the combination of means defining a pair of chambers, partition means separating said chambers and having an opening therein, means defining an annular channel in the partition means, a rotatably mounted member extending through said opening and having portions thereof extending into said channel, an electrically conductive fluid in said channel and being in intimate contact with the partition means and the rotatably mounted member, and means for electromagnetically propelling the fluid circumferentially through said channel comprising means for passing an electric current through the fluid and means establishing magnetic lines of force in a direction substantially normal to the current.

6. In a seal arrangement, the combination of means defining a pair of chambers, a partition member extending between said chambers, said partition member having an opening, means defining an annular channel extending adjacent said opening, a rotatable member extending through said opening and having portions thereof extending substantially through 360 degrees into said channel, an electrically conductive fluid located in said channel and in intimate contact with the partition means and the rotatable member, an annular electrode located in the outer periphery of the channel, a second annular electrode having a smaller diameter than the first electrode extending into the channel and in contact with the fluid therein, means for passing a current radially from one electrode to another electrode, and means for passing a magnetic field substantially normal to the direction of current flow in said fluid.

7. A seal for a pair of spaced members, a baffle member in contact with one of said members and extending toward the other, an electrically conductive fluid located between and in contact with said spaced members, means for passing an electric current through the fluid, and means for passing magnetic lines of force in a direction substantially normal to the current to electromagnetically propel the fluid relative to one of the members.

References Cited in the file of this patent

UNITED STATES PATENTS

| | | |
|---|---|---|
| 2,461,655 | Noble | Feb. 15, 1949 |
| 2,834,618 | Wiltse | May 13, 1958 |
| 3,045,599 | Carlson et al. | July 24, 1962 |